Feb. 21, 1939.  J. W. HAMBLIN  2,148,352
POWER TRANSMISSION APPARATUS
Filed July 28, 1934  5 Sheets-Sheet 3

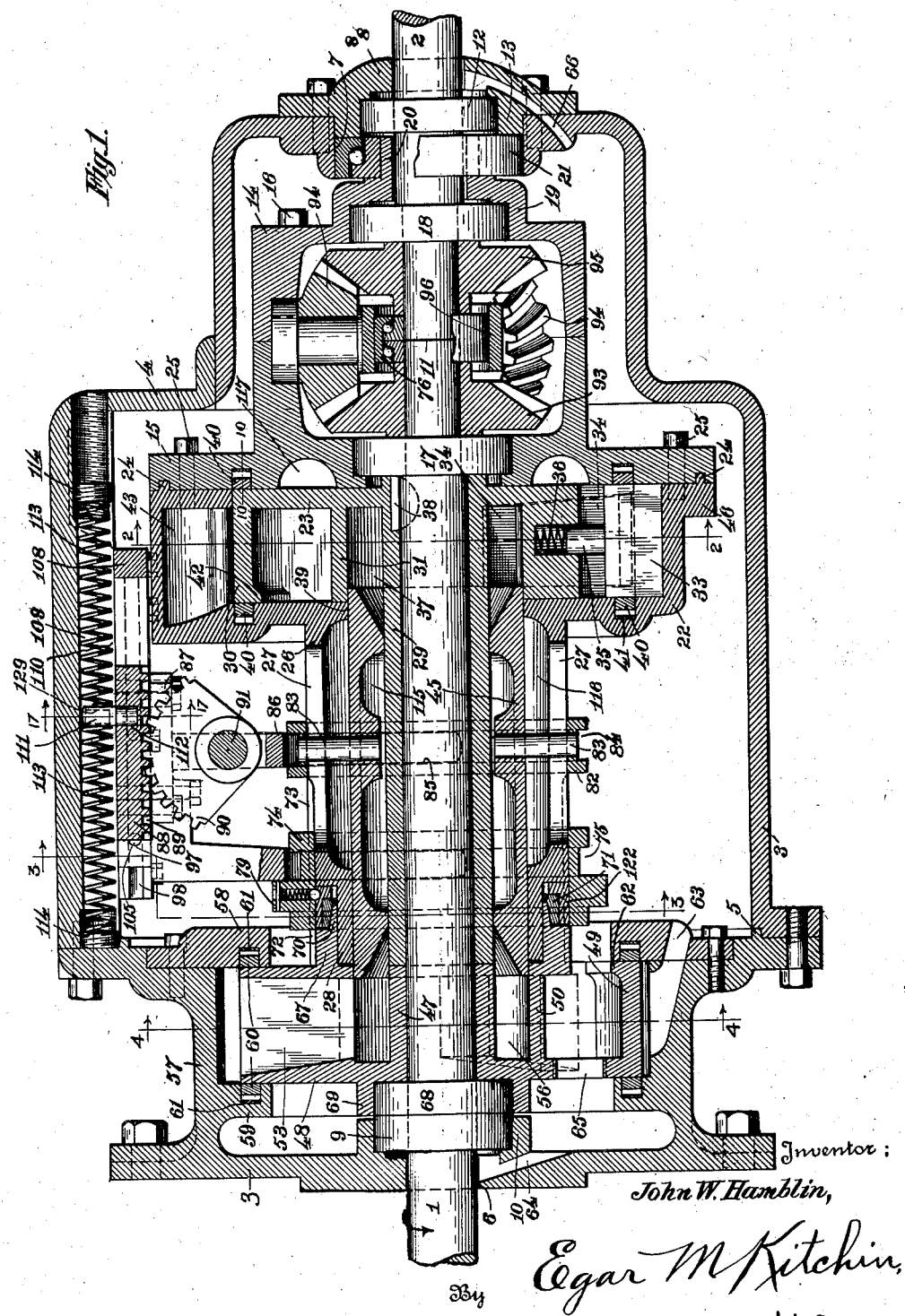

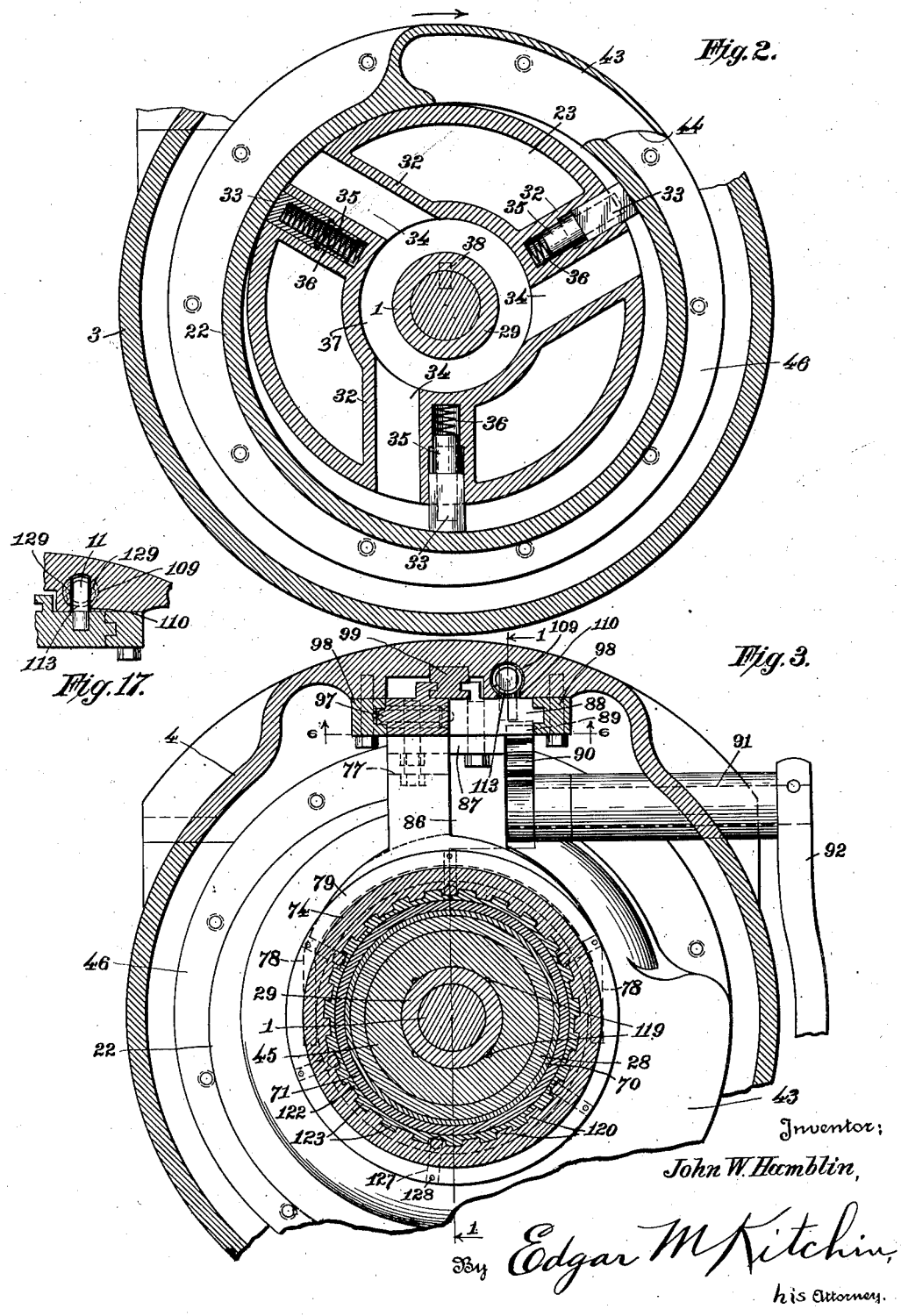

Inventor:
John W. Hamblin,
By Edgar M. Kitchin,
his Attorney.

Feb. 21, 1939.  J. W. HAMBLIN  2,148,352
POWER TRANSMISSION APPARATUS
Filed July 28, 1934  5 Sheets-Sheet 5
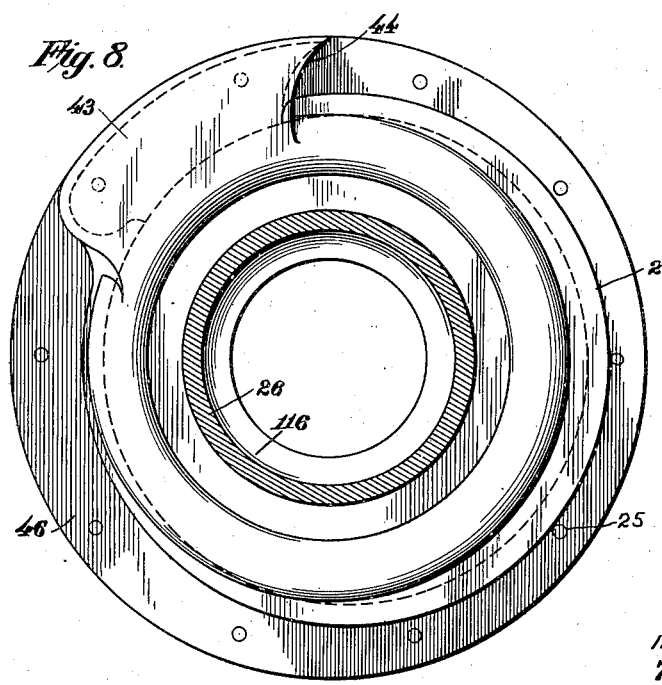
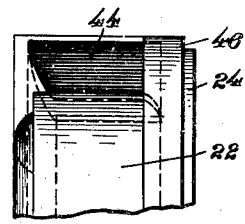
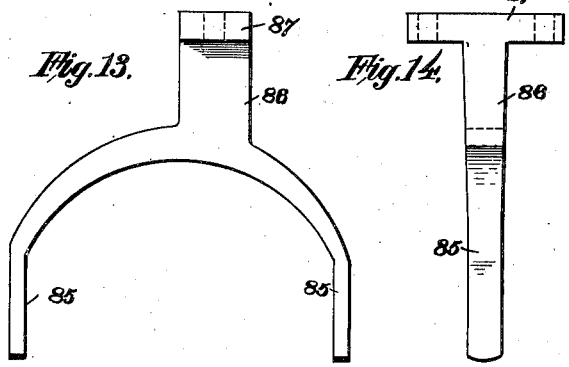
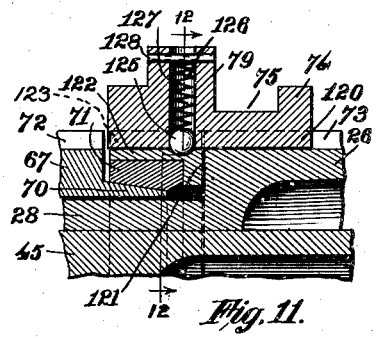
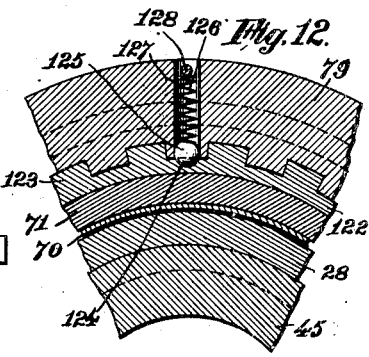
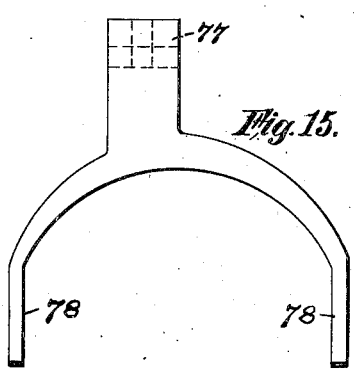
Inventor:
John W. Hamblin,
By Edgar M. Kitchin
his Attorney.

Patented Feb. 21, 1939

2,148,352

UNITED STATES PATENT OFFICE 2,148,352

POWER TRANSMISSION APPARATUS

John W. Hamblin, Lima, Pa.

Application July 28, 1934, Serial No. 737,439

12 Claims. (Cl. 74—293)

This invention relates to apparatus for transmitting power at variable speeds with proportionally variable force, and has as its essential object the capacity to vary the rate of transmission at any of an infinite number of ratios from zero to maximum speed; and a further object is the accomplishment of this transmission without dependence upon intermeshing gears for the changes of speed.

A more detailed object is the accomplishment of said objects hydraulically.

A further object is the transmission of power and the reversal of its direction by means capable of an infinite number of speed variations from zero to maximum, and a still more detailed object is the accomplishment of such reversal hydraulically.

With these and further objects in view as will in part hereinafter become apparent and in part be stated, the invention comprises a power receiver, a power deliverer, and means therebetween for varying the ratio of transmission without limit from zero to maximum.

The invention also comprises said receiver and deliverer and hydraulic means therebetween for the transmission of the power, and means for varying the speed of delivery of power incident to variation in the rate of flow of the hydraulic means.

In still greater detail, the invention comprises a power receiver or rotor, power deliverer or housing for the rotor, fluid between the two for delivering power from the former to the latter, and a valve for varying the power transmission relation of the fluid with respect to the said receiver and deliverer.

The invention still further comprises the said power receiver, deliverer, hydraulic transmission means, and valve, the valve comprising a reciprocally-mounted sleeve movable to and from positions interrupting to varying degrees from complete interruption to no interruption the circulation of the hydraulic means between the receiver and deliverer.

The invention still further comprises the said parts with reciprocating vanes between the receiver and deliverer for causing the hydraulic means to transmit power at a rate varying proportionally to the variation in the freedom of the hydraulic means to circulate between the receiver and deliverer.

The invention still further comprises hydraulic means for transmitting power at variable rates, and hydraulic means for reversing the direction of said delivery.

The invention still further comprises the said two hydraulic means with interconnected means for controlling the action of each relative to the other.

The invention still further comprises the last-named apparatus in which the interconnected means is a valve structure common to both hydraulic means.

In a completely organized structure adapted for such work as the control and transmission of power in vehicles, such as automobiles, ships, and the like, the present invention is intended to be expressed in the form of a unit including a forward drive transmitter and a reverse drive transmitter, each hydraulic in its operation, and means for controlling the hydraulic action, whereby the reverse drive plays freely without transmitting action, while the forward drive is functioning to deliver power in a forward direction, and the forward drive ceases to transmit power before the reverse drive begins to transmit power in the reverse direction; and the invention comprises such a unit, and also a unit as stated, in which the reverse driving is accomplished incident to a slowing down of the movement of the forward drive.

In such embodiments of the invention as last stated, the invention also comprises differential gearing connected to the forward drive for imparting a reverse driving action incident to the slowing down of the forward drive under the influence of the reverse drive.

The invention also comprises certain other novel constructions, combinations, and arrangements of parts as subsequently hereinafter indicated and recited in the appended claims.

In the accompanying drawings,—

Figure 1 is a longitudinal, vertical, central section through power transmission apparatus incorporating an embodiment of the present invention, parts being seen in elevation, and the parts being constructed for such uses as transmission of power in vehicles, conveyors, or other apparatus where differential and reverse delivery of power is desirable.

Figures 2, 3, and 4 are vertical sections taken on the planes indicated respectively by the lines 2—2, 3—3, and 4—4 of Figure 1, and all looking from the front toward the rear, as indicated by the arrows in Figure 1.

Figure 8 is a transverse section through the sleeve of the power receiver showing the power receiver in side elevation detached.

Figure 4:
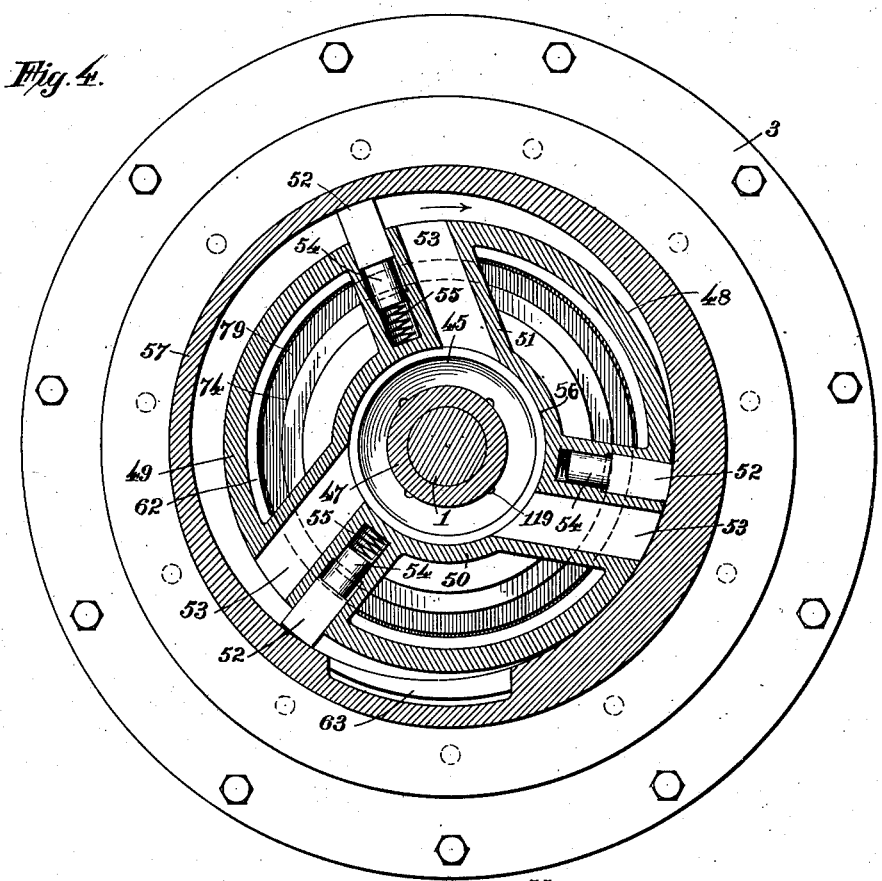

Figur 9 is a fragmentary, edge view of the upper portion of the parts seen in Figure 8 looking directly into the entrance opening of the pick-up or scoop of the power receiver.

Figure 10 is a fragmentary section through one of the sleeve rings and springs and adjacent parts.

Figure 11 is a fragmentary section on the same plane as the section of Figure 1 showing the synchronizer and actuating parts therefor on an enlarged scale.

Figure 12 is a circumferential section taken on the plane indicated by line 12—12 of Figure 11.

Figures 13 and 14 are views in side elevation and edge respectively of the actuator fork for the sleeve valve.

Figures 15 and 16 are views similar to Figures 13 and 14 respectively of the actuator fork for the synchronizer.

Figure 17 is a fragmentary section on line 17—17 of Figure 1.

Referring to the drawings by numerals, 1 indicates a power shaft which is driven from any appropriate source of power, such, for example, as the internal combustion engine of a motor vericle, and 2 is the drive shaft actuated by power transmitted through an embodiment of the present invention from the shaft 1. The shaft 2 may be of any of the various forms utilized for delivering power to the differential gear of a motor vehicle, to the propeller of a ship, or to the parts to be driven of any apparatus in which variable transmission is desirable. The shaft 1 extends into a housing 3 which preferably encloses all of the transmission apparatus, and may be made up of separable parts rigidly connected and joined to avoid leakage while enabling access to the interior by the detachment of any required section or part. As shown, the housing 3 consists of two main sections detachably bolted together and provided with a cover 4 removably fixed to the housing. An appropriate centering rib 5 outstands from one of the sections and facilitates location of the other when being assembled. The housing 3 is, of course, susceptible of any desired variation according to the details of interior construction, and is shaped to cooperate with the contained parts, as hereinafter mentioned. The ends of the housing 3 are closed except for passageway 6 at the front end to accommodate the power shaft 3, and an opening 7 at the other end to provide for the passage of the drive shaft 2 and to accommodate a detachable cap 8 closing the opening 7 and surrounding the shaft 2.

A bearing 9 is preferably set in an annular boss 10 extending inward from the front end of the housing 3 surrounding the opening 6, the bearing 9 consisting of the usual annular bearing housing, raceway or cone surrounded thereby and ball or roller or other antifriction bearings therebetween. The power shaft 1 extends axially lengthwise of the housing 3 to a point 11 where it substantially abuts and is axially alined with the inner end of the drive shaft 2. A bearing 12 similar in construction to the bearing 9 is seated in an annular boss 13 which extends inward from the cap 8 and surrounds and supports the shaft 2. The abutting extremities of the shafts 1 and 2 are disposed within a boxing 14 having a front end closure 15, the boxing being made up preferably of detachable sections secured together, as by bolts 16, or other detachable securing means, and seated within the boxing are bearings 17 and 18, similar to bearings 9 and 12, surrounding and supporting the respective shafts 1 and 2. The boxing 14 is provided with a boss 19 to accommodate the bearing 18, and the said boss 19 is provided to rotate on a bearing 21, similar to bearings 9, 12, 17, and 18. Bearing 21 is seated in the opening 7 and abuts at one face against an annular shoulder of boss 19 and at the other face against the inner face of boss 13.

The boxing 14 is fixed to a drum-like or annular housing 22 which comprises the power deliverer and which surrounds and encloses the main rotor or power transmitter 23. A centering rib 24 preferably outstands axially from the housing 22 into an annular groove in the face of the outstanding flanged portion of the front end closure 15 to insure a snug joint between the two parts, and appropriate bolts or other detachable securing means 25 connect the parts to normally function as a unit while facilitating assemblage and dismantling. Preferably formed integral with and outstanding axially forwardly from the front of the housing 22 is a sleeve 26 slotted longitudinally at 27, 27, the slots being arranged diametrically opposite each other, and forward of the slots sleeve 26 is reduced to provide an axially extending annular band or drum 28. Formed integral with or appropriately fixed to the rotor or power transmitter 23 is an axial sleeve 29 which extends forwardly and terminates in the transverse plane of the forward edge of the band or drum 28, the sleeve 29 snugly surrounding and being seated on the shaft 1. The power transmitter or rotor 23 consists essentially of a disc fixed to and preferably formed integral with the sleeve 29 and arranged concentric to the shaft 1, and having forwardly axially outstanding concentric annular flanges 30 and 31 shaped to provide an enclosed annular space divided by partitions 32 integrally outstanding from the inner flange 31 to and formed integral with the outer flange 30 to provide housings for radially reciprocating vanes or pistons 33, and also to provide a circulating port 34 immediately in advance of each of the respective pistons 33. Each of the partitions 32 and the parts provided thereby are set preferably at an angle so as to be slightly tilted back from the direction of travel during the rotation of the power transmitter 23. Each vane or piston 33 consists of a blade movable substantially radially within its respective housing in a direction toward and away from the shaft 1 and having a guiding skirt 35 extending inward from the vane. Each skirt 35 slidingly engages the surrounding wall of the bore or recess in the partition in which the respective piston 33 is seated, and both the skirt and piston are preferably hollow or tubular to accommodate therein a spring 36 tensioned to constantly stress the respective piston outward. The spring is preferably in the form of a coil and at one end seated against the base of the recess for the skirt 35 and at the other end engaging the piston.

The annular space 37 between the flange 31 and sleeve 29 forms a port or passageway intercommunicating all of the ports 34. The sleeve 29 and parts carried thereby are fixed to and rotate with the shaft 1, and the connection is preferably readily detachable, such as by the provision of an appropriate detachable key 38 seated in the shaft and in the sleeve 29. Thus, the power transmitter 23 is, in fact, a rotor. The annular housing 22 or power deliverer is made up at its front side of an annulus having its inner periphery, at 39, concentric with the shaft 1 and flush with the inner surface of the flange 31, while the outer periphery of said annulus is eccentric to the shaft and to the flange 30 of the power transmitter 23, as clearly seen in Figures 2 and 8, the outer periphery of the said annulus being provided preferably with an integral drum-like axially-extending circumferential flange to meet the front face of the closure 15 of boxing 14, the drum-like flange having a peripheral outstanding flange 46 at its free edge to strengthen the structure and increase the face contact with the closure 15. It should be understood that the said annulus with its drum-like flange and the engaged parts of boxing 14 constitute the power receiver adapted to be rotated by the influence of the rotation of the rotor 23, and the closure 15 may, therefore, be considered a part of the housing 22. The power transmitter 23 is preferably sealed off in non-leaking relation to the thus surrounding housing 22 by appropriate circumferential sealing rings 40 stressed by circumferential springs 41 into intimate face contact with contiguous face portions of the rotor or power transmitter 23. Each spring 41 is wave-like in formation so as to present contacting portions alternately with the respective sealing ring 40 and the respective walls of the housing 22. The said walls of said housing are preferably annularly recessed to accommodate the rings 40 and springs 41. The forward or free edge portions of the flange 30 are preferably provided with an inturned lip 42 to afford sufficient width to insure effective sealing action of the forward sealing ring 40.

The several vanes or pistons 33 are thus adapted to ride with their outer or free edges resting against the inner periphery of the housing 22 and to reciprocate substantially radially incident to relative rotation of the rotor 23 with respect to the housing 22 to the extent requisite to maintain such contact incident to the eccentricity of the inner periphery of said housing. At one point in the circumference of the housing 22 an intake impeller or scoop 43 is provided having an entrance opening 44 (see Figures 2, 8, and 9) located to admit fluid directly through the periphery of housing 22 as the scoop 43 is rotated into a body of fluid in the lower portion of the housing 3 to supplement any losses of fluid from within the housing 22.

A sleeve valve 45 is snugly seated to reciprocally slide on the sleeve 29, and has its cylindrical outer surface at its rear end portion proportioned and located to snugly fit and slide within the inner periphery 39 and the inner periphery of flange 31, so as to be capable of moving across the ends of the ports 34 and shutting off their intercommunication through the annular space 37. It should thus be apparent that when the valve 45 is shifted rearward, the farther it is moved the greater will be the reduction in the communication of the several ports 34 with the space 37 to the point where all communication can be cut off, and if all communication is cut off, then the fluid between the several pistons or vanes 33 can not escape in advance of the vanes and serves to clutch or secure the power transmitter 23 to the housing 22 or power deliverer, whereby the said housing will be caused to move with and at the same rate of movement of the power transmitter 23. On the other hand, when the valve 45 is moved forward sufficiently to allow intercommunication between the ports 34 and the space 37, and, therefore, between the several ports, there will be relative slippage to the extent to which the fluid can flow out of the eccentric chambers between the several pistons or vanes 33 and between the power transmitter 23 and housing 22. That is to say, if the valve 45 is in its fully retracted position with respect to the ports 34, the fluid in advance of any particular piston will flow readily through the respective port 34 which is immediately in advance of the respective piston about a sector of the space 37 and out the next port to allow for the reducing area of the eccentric space as the respective piston is entering the diminishing space and to allow for the filling of the space for the next piston as it is entering the widening space. Accordingly, the rotor or power transmitter 23 can be revolved freely within its housing 22 when the ports 34 are fully open. Also, of course, incident to incomplete circulation of the fluid, the housing may be allowed to rotate at a slower rate than the rotation of the power transmitter or rotor 23. Variation in the relative rates of rotation may be effected to any desired degree by merely varying the amount of circulation permitted incident to greater or less closing of the ports by the valve 45 up to the point where the ports are completely closed and there is no relative movement between the rotor 23 and its housing 22. Thus, the housing 22 can be readily caused to move as a unit with the rotor 23.

Of course, the forward portion of the valve 45 and the parts cooperating with it may be of different diameters than the parts just described, but for convenience of construction and assemblage, for efficiency, and for inexpensiveness of production, the sleeve valve 45 is externally a continuous, single cylinder of uniform diameter, and the inner periphery of the band of drum 28 is proportioned to snugly receive and allow reciprocation of the forward portion of the sleeve valve 45.

Figure 5:
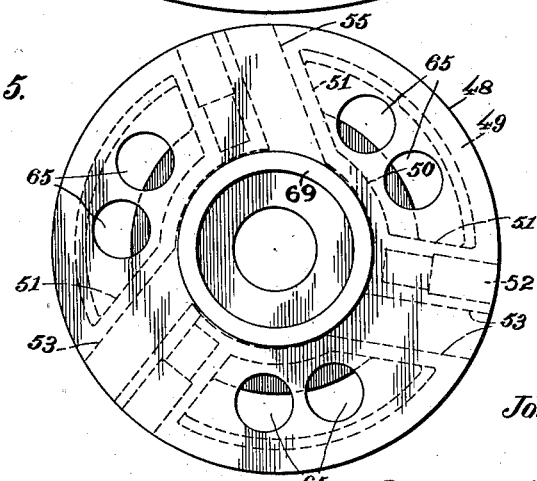
Figure 5 is an end elevation of the reverse rotor viewed from the front looking toward the rear and shown detached.

Surrounding the shaft 1 forward of and abutting against the sleeve 29 is a sleeve 47 which forms part of a reverse, frictional power transmitter or rotor 48. The rotor 48 is seen in axial section in Figure 1, in transverse axial section in Figure 4, and in end elevation in Figure 5, the latter being observed from a plane forward of the rotor 48 and looking toward the rear. This rotor 48 consists essentially of a structure practically identical in contour with that of the rotor 23 including a disc fixed to or formed integral with the sleeve 47 and arranged concentric to the shaft 1, and from which disc outstands axially the concentric flanges 49 and 50, shaped to provide an enclosed annular space divided substantially radially by partitions 51 integrally outstanding from the inner flange 50 to and formed integral with the flange 49 to provide housings for radially reciprocating vanes or pistons 52, and also to provide circulating ports 53, one immediately in advance of each of the pistons 52. Each port 53 communicates with the exterior of the rotor 48 at its outer end and at its inner end communicates with the concentric space 56 between the flange 50 and the sleeve 47. Each of the partitions 51 and the parts provided thereby are set preferably at an angle so as to be slightly tilted back from the direction of travel during rotation of the rotor 48. Each vane or piston 52 consists of a blade movable substantially radially within its respective housing in a direction toward and away from the shaft 1 and having a guiding skirt 54 extending inward from the vane. Each skirt 54 slidingly engages the surrounding wall of the bore or recess in the partition in which the respective piston 52 is seated, and both the skirt and piston are preferably hollow or tubular to accommodate therein a spring 55 tensioned to constantly stress the respective piston outward. The spring is preferably in the form of a coil and at one end seated against the base of the recess for the skirt 54 and at the other end engaging the piston.

The annular space 56 forms a port or passageway intercommunicating all of the ports 53, so that when the ports 53 are not closed fluid is free to circulate from the exterior of the rotor through a port 53, through space 56, and through an adjacent port 53, whereby fluid in advance of a piston 52 which is moving into reduced areas can flow readily to a position in advance of a piston moving into enlarging areas.

The rotor 48 is arranged within a portion of the housing 3 especially shaped to receive it and providing a cylinder 57 disposed eccentric to the shaft 1 and the periphery of the rotor 48, whereby at one point the periphery of the rotor 48, comes into contact with the inner periphery of the drum 57, and the tapering space of the eccentric relation of the drum 57 with respect to the rotor 48 is left for the functioning of the liquid and of the pistons 52.

It will be seen best from Figure 1 that the forward end of the cylindrical sleeve valve 45 is proportioned and located to reciprocate into and out of positions for closing or partially closing the ports 53 by more or less occupying the annular space 56. It is to be noted that the inner periphery of the flange 50 is flush with the inner periphery of the band or drum 28 of sleeve 27, so that a snug, non-leaking contact of valve 45 with said band 28 and with the inner periphery of flange 50 insures efficiency in the control of the freedom with which the fluid circulates through the several ports 53 and about the space 56.

A face plate in the form of an annulus 58 is detachably fixed to an appropriate portion of the housing 3 as a part of the drum 57, and an inwardly extending flange 59 preferably formed integral with the housing 3 completes the drum 57 and encloses the peripheral portion of the rotor 48. Sealing rings 60 are provided for the respective faces of the rotor 48 and are stressed by springs 61 to sealing relation with respect to said rotor after the manner of the construction and functioning of the rings and springs 40 and 41, the rings and springs 60 and 61 being seated in annular grooves in the plate 58 and flange 59 respectively. The flange 49 is provided with an inturned lip 62 to sufficiently increase the width of the free edge of the flange to provide the requisite seat for the respective ring 60, so as to seal off the interior of the rotor 48. Since the lower part of the housing 3, during operation, is supplied with fluid, an intake port 63 is preferably provided leading from a lower portion of housing 3 to within the drum 57 to allow pick up of fluid when and as required to supplement fluid lost in the operation of the rotor 48. As the fluid is distributed throughout all the moving parts within the housing 3, appropriate drain backs are preferably provided wherever required to insure avoidance of undesired accumulations of fluid at upper portions, and, to this end, a port 64 leads from in advance of the bearing 9 and ports 65 lead through the rotor 48. Likewise, a port 66 leads from the rear of the bearing 12 to a lower portion of housing 3 for drain back purposes.

As will become apparent from the operation of the structure, it is entirely feasible to permanently connect the rotor 48 with the sleeve 26, and for purposes of operation there must be at least temporary rigidity between the two when the rotor 48 is functioning to occasion the transmission of reverse driving force to the shaft 2. To accomplish this result, if the rotor 48 is not permanently fixed to or formed integral with the sleeve 26, an appropriate clutch is preferably provided and facilitates employed for shifting the clutch to and from the engaging connection between the rotor 48 and sleeve 26.

When such clutch construction is employed, the rotor 48 at its rear face is provided with an axially outstanding annular boss or flange 67 surrounding and finding bearing on the outer periphery of the band or drum 28. The rotor, however, is chiefly sustained by a bearing 68 similar to bearing 9 and having face contact therewith and surrounding and supported by the shaft 1. The bearing 68 is mounted in a housing consisting of a forwardly extending boss or annular flange 69 outstanding from the front face of the disc of rotor 48.

When the clutch construction is employed for connecting and disconnecting the rotor 48 with the sleeve 26, any appropriate and well known form of clutch may be utilized, one of which forms includes means for synchronizing the motion of the parts so as to effect the clutching action soundlessly in a well known manner, as, for example, by the provision of a tapered extension or cone frustum 70 extending from the flange 67 along the drum 28 and within a surrounding cone 71. The flange 67 is provided with keyways or clutch teeth 72, and the sleeve 26 is provided with similar keyways or clutch teeth 73. On the keyways 73 is slidingly mounted a shifting ring 74 having a circumferential groove 75 receiving the shifting fork 78 carried by the operating plate 77. The inner periphery of the ring 74 is provided with clutch teeth 120 intermeshing with the clutch teeth 73 of sleeve 26 and adapted to intermesh with clutch teeth 72 of flange 67 for connecting the rotor 48 with the sleeve 26, and this may be accomplished in any of the well known ways, and may be facilitated by the use of the parts 70 and 71 for bringing the parts into synchronism. The sleeve 26 is provided at the rear end of the band or drum 28 with an offset shoulder 121 which faces the rear edge of the flange 67 and is spaced therefrom for accommodating therebetween the cone 71 and a surrounding ring 122 enclosing the cone 71 and having clutch teeth 123 intermeshing with the clutch teeth 120. The ring 122 is provided with a circumferential, inwardly-extending flange abutting against the rear edge of the cone 71. Cone 71 is preferably of friction material, such as brake band material of the type commonly used for lining brakes of motor vehicles, and is anchored to the ring 122 and its flange in any appropriate manner, whether by interlocking teeth or rivets, or other attaching or securing means, so that the cone 71 moves with the ring 122. Ring 122 at various points about its periphery, preferably uniformly spaced as seen in Figure 3, is formed with preferably parti-spherical depressions 124 in each of which is normally seated a ball 125 stressed into the seated position by an appropriate coiled spring 126 located in a bore 127 in an enlarged portion 79 of ring 74. The outer end portions of the several springs 126 are anchored against release in any appropriate manner, such as by cross pins 128 extending through the enlargement 79.

Thus, when the parts are in the neutral position, that is the position where both rotors 23 and 48 are free to revolve without transmission of power, the clutch ring 74 will be in the position seen in Figures 1, 11 and 12, and any shifting movement of the ring 74 forwardly will cause the several balls 125 to move the ring 122 forwardly and thus cause the cone 71 to frictionally engage the cone 70, whereby synchronism between the movement of flange 67 and sleeve 26 is produced, so that the teeth 73 and 72 are brought into alinement, the teeth 123 being already in alinement with the teeth 73. The ring 74, being under a stress tending to move it forwardly, will move to a position with its teeth 120 meshing with the teeth 72 as soon as this alinement is accomplished by the synchronizer action of the cone 71 and ring 122. Of course, as soon as the ring 74 begins to move independently of the ring 122, the several balls 125 will move out of the recesses 124 against the pressure of their springs 126 and roll along on the ring 122. Intermeshing of the teeth 120 with teeth 72 clutches the flange 67 with sleeve 26 and rotor 48 is thereby brought into effective action and continues to act until reverse movement of the sleeve 74 restores the parts to the position seen in Figure 11. In this restoring movement, the balls 125 first roll along the ring 122 until they drop into the recesses 124 and then cause the ring 122 to move with ring 74 to the inoperative position.

The operation of the valve 45 with respect to the rotor 48 is the same as that with respect to the rotor 23, except that the fluid acted upon by the rotor 48 impinges against the walls of the housing 3, that is against the surrounding drum 57, and since that drum is relatively immovable, the rotor 48 can not impart motion thereto and the rotor itself is accordingly retarded in its motion to a greater or less extent, according to the extent to which the valve 45 is caused to interrupt flow of fluid through the ports 53. Complete interruption of such flow will, of course, produce a complete cessation in the rotation of the rotor 48 and a resulting stopping of the rotation of the housing 22 and parts connected therewith, whereby reverse motion is transmitted to the shaft 2 through the differential gearing within boxing 14, hereinafter to be described.

It is, of course, obvious that facility must be provided for the shifting of the valve 45, and that the location of the valve will control both the direction and the speed with which power is transmitted from the shaft 1 to the shaft 2. It is also obvious that any of numerous instrumentalities may be utilized for shifting and controlling the valve 45, one form of which is shown as consisting of a shifting ring 82 surrounding the sleeve 26 and having trunnion-like pins 83 extending inward from the ring through the slots 27 into and fixed to the sleeve valve 45. The ring 82 is provided with the usual annular groove 84 into which extends the fingers 85 of the fork 86 carried by the actuating plate 87. The plate 87 may be operated by any of numerous well known instrumentalities, one form of which is seen in detail in Figures 1, 3, and 6, wherein the plate 87 is shown as bolted or otherwise appropriately detachably fixed to a slide 88 having a toothed rack 89 meshing with the teeth of a segmental gear 90. The gear 90 is fixed to an operating shaft 91 which extends to the exterior of the housing 3 and is there engaged by any appropriate operating lever or handle 92. The handle 92 may be connected to any desired control or actuator, not shown. The shifting of the valve 45 longitudinally is thus accomplished by the movement of the lever 92 and its connected parts, whereby the valve may be moved from a completely seated position in the annular space 37 completely closing the ports 34 to a completely seated position in the annular space 56 completely closing the ports 53. The parts are so proportioned that the valve may assume a substantially neutral position where all the ports are entirely or substantially entirely open, so that the shaft 1 may be revolving, and, of course, the power transmitter or rotor 23 revolving without delivering any power in either direction to the shaft 2. From such neutral position, the valve 45 may be moved in either direction, according to the desired direction of rotation of the shaft 2. If the operator wishes the shaft 2 to move in the same direction as shaft 1, which may be considered the forward driving direction, it is only necessary for him to shift the lever 92 in the direction for causing the valve 45 to move rearwardly and to cut off more or less of the flow through the ports 34. As soon as this is done, the resistance set up by the fluid that can not escape transmits power from the rotor 23 to the housing 22, and thence through boxing 14 to the shaft 2 through the differential gears within the boxing and hereinafter to be described. Likewise, when the operator desires the shaft 2 to move in a reverse direction to the direction of rotation of shaft 1, he shifts the valve 45 from the neutral position forward to close the ports 53 to a greater or less extent. In so doing, of course, the ports 34 are left fully open, which leaves the rotor 23 free to play within the housing 22 without transmitting power thereto. Of course, before shifting the valve 45 to the position for closing or partly closing the ports 53, the operator must see that sleeve 26 is clutched to the rotor 48 if the parts are not permanently connected and a clutch is employed. As the valve begins to shut off the circulation through the ports 53, a braking or retarding action is caused against the rotor 48 incident to the impact of the fluid against the non-moving walls of the drum 57.

It will be readily understood by those skilled in the art of transmission gearing that a differential gear being arranged in the boxing 14, as hereinafter described, for transmitting motion from shaft 1 to shaft 2, the housing 22 will be revolving whenever the shaft 1 is in motion, even though the valve 45 is in the idling position and no power is being transmitted from rotor 23 to the housing 22. It follows, therefore, that when the sleeve 26 and rotor 48 are interlocked or clutched together, and the rotor 48 is retarded in its rotation, it serves as a brake to proportionally slow down the rotation of the housing 22 and the boxing 14 while the shaft 1 continues to rotate at normal or predetermined speed, and therefore, the gearing contained within the boxing 14 will transmit to the shaft 2 motion in a reverse direction and at a rate proportional to and less than the speed of shaft 1 so long as the housing 22 continues to turn, depending on the gear ratio of the gears in boxing 14 and the extent to which the speed of the housing 22 has slowed down. Reverse motion may, therefore, be readily imparted to the shaft 2 by the mere shifting of the valve 45 to position for closing or partly closing the ports 53, the speed of the reverse motion being varied and controlled by the extent to which the circulation through said ports 53 is cut off.

The gearing in the boxing 14 may be any well known differential gear of the general type commonly employed in rear axle construction of motor vehicles, and may have any preferred ratio. For example, a gear 93 is fixed to or formed integral with the shaft 1 and is preferably of the beveled and silent gear type. Gear 93 meshes with corresponding rightangle gears 94, 94, journaled on an appropriate spider fixed within the boxing 14, so that the gears 94 may either travel bodily with the gear 93 or "walk" thereon. Fixed to the shaft 2 or formed integral therewith within the boxing 14 is a gear 95 similar to gear 93, and also meshing with the gears 94. Three gears 94 have been indicated in the accompanying drawings, and are preferred for average construction, but a greater or less number of gears 94 may be used when and if desired. The spider for the gears 94 terminates inward in a ring 96, which is of a width sufficient to enclose a double bearing 76, one each for the terminals of the shafts 1 and 2. It will thus be obvious that when the shaft 1 is rotating and the rotor 23 is transmitting full forward driving speed, that is with the valve 45 completely closing the ports 34, the gears 94 will be carried with the gear 93 and will carry with them the gear 95, so that the shaft 2 is rotated in the forward direction at the same speed as the shaft 1. Now if the valve 45 be retracted somewhat, that is moved forwardly, and a certain amount of circulation is thereby permitted through the ports 34, there will be a proportional relative movement of the rotor 23 with respect to the housing 22 and a corresponding lag in the motion of the housing 22 which will result in a proportional slowing down of the rotation of the shaft 2, the gears 94 walking along the respective gears 93 and 95 to compensate for this differential. The result is not only reduction in speed, but an increase in the force or power with which the shaft 2 is driven relative to the power of shaft 1. Accordingly, an infinite number of variations in speed and power are available for transmission from zero to maximum from shaft 1 to shaft 2, all accomplished by the mere shifting of the valve 45 and the proportional variation in the circulation permitted through the ports 34.

For purposes of comparison, and to better aid ready appreciation of the principles of operation, the rotor 23 functions somewhat as a clutch with respect to housing 22, but with available ready slippage without friction or injury, and likewise the rotor 48 functions substantially as a brake with respect to the fixed drum 57 with ready slippage and without friction or injury.

Figure 6:
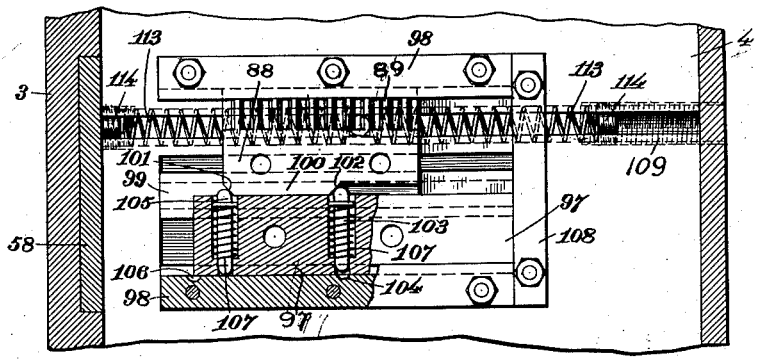
Figure 6 is a horizontal, sectional, inverted plan view taken approximately on the plane indicated by line 6—6 of Figure 3.

When the synchronizer of which the shifting ring 74 is a part is employed in that type of construction where the rotor 48 is not permanently anchored to the sleeve 26, any appropriate means may be provided for shifting the ring 74 to and from the clutching position and thereby connecting and disconnecting the rotor 48 with respect to sleeve 26; but it is quite desirable for convenience and efficiency of operation to provide means whereby parts which shift the ring 82 will operate devices for actuating the ring 74 correspondingly, and, to this end, the slide 88, as best seen in Figures 3 and 6, preferably is constructed to cooperate with and to actuate the operating parts for the plate 77 and its operating fork 78. Accordingly, a slide 97 is mounted in the cover 4 in contact with the slide 88 to at times move therewith, and to the slide 97 is fixed the plate 77. Slideways 98, 98 and 99 are detachably carried by the cover 4, and the slides 88 and 97 are provided with appropriate splines or ribs slidingly mounted in grooves in said slideways to insure accuracy and efficiency in the functioning of the said slides. A lateral extension 100 (see Figure 6) projects from one edge of slide 88 into contact with the adjacent edge of slide 97 and terminates in a beveled or cammed end 101 at one end and a corresponding beveled or cammed end 102 at the other end located, when the parts are at rest, that is when the valve 45 is in its neutral position, to have the cam 102 contact with the rounded projecting end portion of an appropriate plunger 103 reciprocally mounted within and extending through the slide 97 in position to have its opposite end engage a recess 104 in the corresponding guideway 98. Likewise, the cam 101 contacts with the rounded projecting end portion of a plunger 105 similar in construction and arrangement to plunger 103 and adapted at times to enter a recess 106 in the last-named guideway 98. Each plunger 103 and 105 is stressed by an appropriate spring 107 toward the slide 88. Thus, when the parts are in the position seen in Figure 6, that is with the valve 45 in its neutral position and the lever 92 is operated to shift the slide 88 in a direction to cause the valve 45 to enter the annular space 37 so as to begin to slow down circulation through the ports 34, the cam 102 depresses the plunger 103 into recess 104, whereby the slide 97 is locked against possible, accidental, forward movement, and the flat edge face of the projection 100 rides across the rounded end of the plunger 103 as the slide 88 is moving to shift the valve 45 further into the annular space 37. In fact, this relation of the slide 88 with respect to the plunger 103 will continue as long as the movements of the slide 88 are for locating the valve 45 with respect to the rotor 23; but whenever the operator moves the slide 88 away from the position of control of the ports 34, the cam 102 will be moved past the plunger 103 and the plunger will thereby be allowed, under the stress of spring 107, to move to the position seen in Figure 6, which releases the slide 97 and leaves it free to shift along with the slide 88, providing that the slide is to be moved in a direction away from the plunger 103 and not toward it. Thus, when the operator desires reverse motion in the shaft 2, and accordingly shifts slide 88 forwardly so as to move the valve 45 into position for beginning to shut off the flow through the ports 53 of rotor 48, such movement of the slide 88 will be accompanied by a corresponding movement of slide 97 incident to the fact that the cam 101 engages the projecting rounded portion of the plunger 105. This movement of slide 97 with the slide 88 will continue until the synchronism between the motion of sleeve 26 and the motion of the rotor 48 is accomplished as above described, and this is completed at or about the time when the plunger 105 reaches alinement with the depression 106, whereupon the cam 101 depresses the plunger 105 into the recess 106 and thereby locks the slide 97 against further movement while the slide 88 is free to continue its forward movement and to carry with it the ring 82 and the valve 45. The straight edge portion of the projection 100 of slide 88 rides over the rounded end portion of plunger 105 during this further movement of slide 88, and any desired shifting of slide 88 toward increased or decreased reverse motion of shaft 2 may be accomplished while the plunger 105 is thus held depressed in the recess 106 and the slide 97 thereby locked against movement; but as soon as the slide 88 is returned incident to the bringing of the valve 45 back to neutral, the cam 101 will in such return motion pass the plunger 105 and allow it to spring out of recess 106 and at the same time the cam 102 will engage the projecting end portion of the plunger 103 and thereby cause the slide 97 to move with the slide 88 until the plunger 103 has reached alinement with the recess 104. The slide 97 is substantially greater in length than the length of the slide 88 and is of sufficient length beyond the plunger 103 for causing the rear end of the slide, when the plunger 103 reaches alinement with the recess 104, to abut against a detachable portion 108 of cover 4 and prevent any further rearward sliding movement of slide 97. After the reverse motion of shaft 2 is completed, and the operator desires to drive the shaft 2 in the forward direction, a return of the slide 88 is all that is required to accomplish this result. With the return movement, the slide 97 is restored to its normal, neutral position as just stated, and the valve 45 may then be shifted for causing the power transmitter or rotor 23 to impart driving force to the housing 22.

Just above the planes of the slides 88 and 97, the cover plate 4 is formed with a tubular bore 109 which may be formed in the wall of the material of plate 4 or constructed as a separate part, as desired. The lower part of the bore 109 is opened by a longitudinal slot 110 and a pin 111 extends from within the bore 109 through the slot 110 into a recess 112 in the slide 88. Coiled springs 113, 113 are arranged in the bore 109, one on each side of the upstanding portion of pin 111 and arranged to engage the pin, the opposite end of each spring being seated against a terminal portion of the bore 109, and the springs being tensioned to preserve the pin 111 at that location in the length of the slot 110 represented by the position of the slide 88 when the valve 45 is in the neutral location. Thus, any movement of slide 88 must be against the pressure of one or the other of the springs 113, and the said springs are preferably tensioned to return the slide to the neutral position when the parts are released, unless the operating handle 92 is held against return movement, as by the engagement of some appropriate form of detent. A plug 114 is preferably threaded into each end portion of the bore 109 to form a seat for the respective spring 113, so that the plug can be threaded along the bore as desired for increasing or decreasing the tension of the spring 113 and thus insuring effective balance of the two springs and the proper functioning thereof to center the pin 111 with the valve 45 in the neutral position. To insure against over-thrust of pin 111 and its slide 88 from any slightly unbalanced tensioning of springs 113 in either direction from the centered or neutral position, the inner end of each spring 113 abuts against spaced fillets 129 located in the length of bore 109 at approximately the neutral position of the pin and between which the pin is free to move.

It should be understood that in the normal operation of the apparatus, when the shaft 1 is idling, that is rotating without delivering power to shaft 2, the rotor 23 will be revolving in a forward direction at full speed but playing freely in the freely circulating fluid, and at the same time the gears 94 will be walking on the temporary stationary gear 95 incident to the action of the gear 93 on said gears 94. This walking movement will be at a speed according to the ratio between the gear 93 and gears 94. A ratio of two to one is appropriate, though other ratios may be utilized when and as preferred, and if the two to one ratio is employed, then when the shaft 1 is idling, the housing 22 will be rotating in the forward direction at half the speed of shaft 1. The action of the rotor 48 is simply to slow down or stop such motion of the housing 22, and when such motion is completely stopped, the gear 93 will directly rotate the temporary, stationarily mounted gears 94 and will impart proportional rotation to the shaft 2, that is the shaft 2 will be rotated in the reverse direction at the speed of shaft 1.

While the rotating elements or rotors above described are properly referred to as hydraulic, they are intended to function with any appropriate fluid preferably possessing the least capacity for compression, such as lubricating oil or the like.

It will be noted that at various places throughout the several parts and elements making up the construction material has been removed or omitted to reduce the weight and save material in the construction of the parts, as, for example, the cutaway portions 115 of valve 45, the cutaway portion 116 of sleeve 26, and the groove 117 in the front face of boxing 14 are for saving weight and material without in any way detracting from the efficacy of the functioning of the parts.

Figure 7:
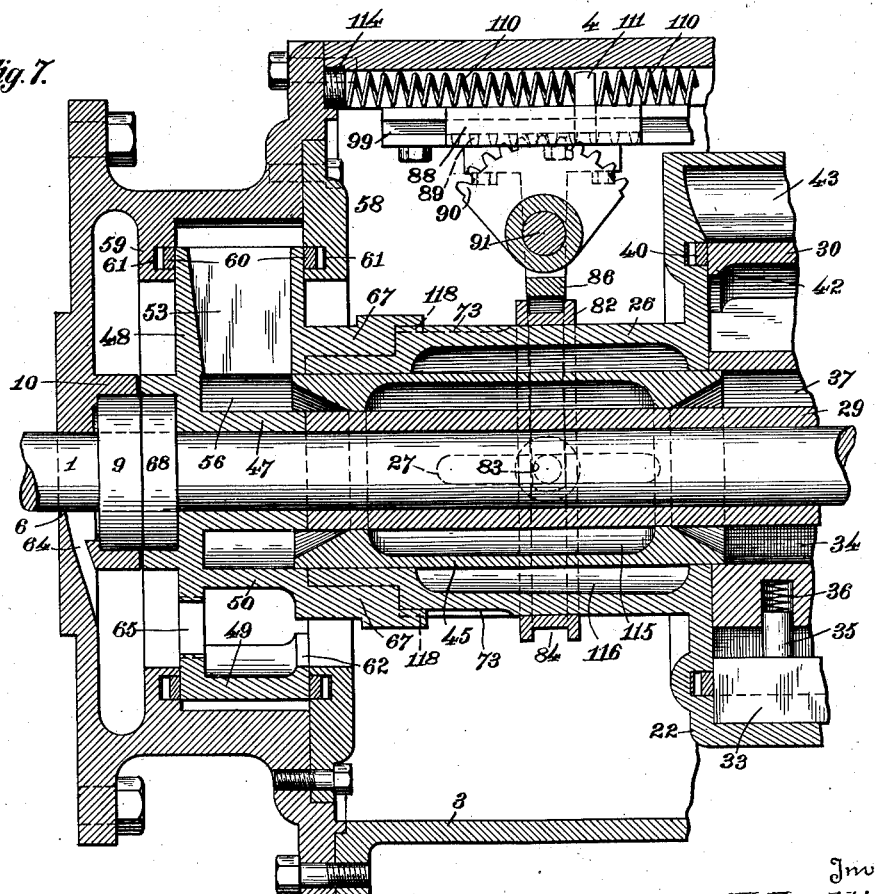
Figure 7 is a fragmentary, vertical, longitudinal section similar to Figure 1 of a somewhat modified embodiment omitting the synchronizer for the reverse rotor clutch, the parts being broken away for the saving of space.

In Figure 7 is shown a fragmentary section similar to Figure 1 with the parts identical with those shown in Figure 1, so that the same description equally applies and the same reference numerals have been employed except that the sleeve 26 is permanently connected to the flange 67 of rotor 48, and this permanent connection may be accomplished in any of various ways, the form shown including interlocking clutch teeth 118 meshing with the clutch teeth or keyways 73 of sleeve 26. The operation of the structure seen in Figure 7 is thus identical with that above described when the flange 67 of rotor 48 has been locked to sleeve 26, and differs from the functioning of the parts seen in Figure 1 only in that the rotor 48 is not at any time released from its connection with the housing 22. Therefore, the rotor 48 in the structure seen in Figure 7 revolves at all times with the housing 22. The capacity of rotor 48 to effect reverse driving of the drive shaft is identically the same as that above described and accomplished in the same manner. The shutting off of free circulation through the ports of the rotor 48 of the form seen in Figure 7 slows down the speed of the housing 22 and thus causes motion to be transmitted through the differential gears in a reverse direction to the drive shaft, as above described.

As illustrated in the accompanying drawings, the valve 45 is preferably formed with beveled counterbores in its end portions presenting conical recesses so that as the valve is moving toward a port-closing position, a certain amount of the oil or other hydraulic vehicle will be pocketed. To avoid such pocketing action and also to release oil pressure and accelerate lubrication of the parts, the inner periphery of the valve 45 is preferably provided with axially-extending ports 119 opening facewise against the sleeve 29. Thus, during operation, whenever the valve is in any position other than either absolute neutral or completely closed, the hydraulic medium will flow through the ports 119, but when the valve reaches its completely seated or closed position in either of the rotors, its peripheral face contact will cut off the supply to the counter-bored or recessed end portion and flow through the ports 119 will, therefore, not continue at the time of maximum speed delivery.

It will be obvious to engineers familiar with gear transmission that many substitute devices may be utilized with varying degrees of efficiency for parts shown and described, all well within the spirit and scope of the present invention. For example, the rotors 23 and 48 and their cooperating parts serve in fact as clutches, and it is entirely feasible from a mechanical operating standpoint to substitute other forms of clutches, such, for example, as multi-disc clutches or centrifugal clutches, providing provision is made to take care of and avoid excess friction. The present detailed construction of these parts is, therefore, preferred as incorporating maximum efficiency in the avoidance of friction and the resulting freedom from heat and loss of power.

The filling and drainage of the housing 3 may be accomplished in any preferred manner from time to time, and any well known provision for the introduction and removal of the oil or other hydraulic medium may be provided, such as the filler opening and drain opening customarily provided for motor vehicle transmission housings, which openings are ordinarily normally retained closed by threaded plugs. Obviously, the drain out opening will be preferably at the lowermost point of the housing, and the filler opening at slightly above the normal liquid level to be maintained within the housing. One acceptable liquid level for housing 3 is substantially the plane of the axis of rotation of shafts 1 and 2.

What is claimed is:

1. Means for delivering power from a power shaft to a drive shaft comprising the combination of a rotor, a housing surrounding the rotor and spaced to provide a chamber between the rotor and housing, reciprocating pistons carried by the rotor for engaging the inner periphery of the housing, the rotor having ports leading from the exterior of the rotor, and the rotor having an intercommunicating port for said ports, valve means for controlling the flow of fluid through said ports, the connection between the housing and the drive shaft comprising differential gearing in combination with a second rotor similar to the first rotor and adapted to be connected to the housing, and a relatively stationary housing for the second-mentioned rotor for braking the motion of the second-mentioned rotor and thereby similarly braking the motion of the housing for delivering reverse rotation to the drive shaft.

2. In power transmission apparatus, the combination, with a power shaft and a drive shaft actuated thereby, of rotors mounted on said power shaft, a housing for one of the rotors, differential gearing connected to the housing for delivering motion from the housing to the drive shaft, the other rotor being adapted to be connected to said housing, hydraulic means for transmitting motion to the housing from the rotor within the housing, hydraulic means for retarding motion of the other rotor, and a valve common to the two rotors for controlling the action of the hydraulic means relative thereto.

3. Means for delivering power from a power shaft to a drive shaft comprising the combination of a rotor, a housing surrounding the rotor and spaced to provide a chamber between the rotor and housing, reciprocating pistons carried by the rotor for engaging the inner periphery of the housing, the rotor having ports leading from said chamber and an intercommunicating port for said ports, a second rotor adapted to be connected to the housing for varying movement thereof for effecting delivery of power from the power shaft to the drive shaft, gearing for transmitting motion from the housing to the drive shaft in a reverse direction when the motion of the housing is varied by the second rotor from its transmission otherwise, and valve means for controlling the flow of hydraulic medium through said ports.

4. The combination as claimed in claim 3 wherein the second rotor is provided with ports similar to those of the first rotor and the valve means is common to the ports of the first rotor as well as to those of the second rotor.

5. In power transmission apparatus, the combination, with a power shaft and a drive shaft for receiving power therefrom, of spaced rotors mounted on said power shaft, one of said rotors being fixed to revolve with the power shaft, a housing for said fixed rotor, differential gears connecting said housing with the drive shaft, means for transmitting power through hydraulic medium from the fixed rotor to the housing, means for hydraulically governing motion of the other rotor, means of connection between the last-mentioned rotor and the housing of the fixed rotor, and means movable axially of the rotors and arranged therebetween for controlling the action of the hydraulic means with respect to each rotor.

6. The combination as claimed in claim 5 wherein the controlling means is an axially movable slide valve.

7. The combination as claimed in claim 5 wherein the controlling means is an axially movable slide valve movable across the hydraulic-means-control ports of the said rotors.

8. The combination as claimed in claim 5 wherein the connection between the second rotor and the housing of the fixed rotor is detachable.

9. The combination as claimed in claim 5 wherein the control means is a sleeve valve mounted to surround and reciprocate along one of said shafts.

10. The combination as claimed in claim 5 wherein the hydraulic means includes radially reciprocal pistons for the fixed rotor.

11. The combination as claimed in claim 5 wherein the hydraulically governing means for the second rotor includes radially reciprocal pistons for the rotor and a fixed housing surrounding the rotor.

12. The combination as claimed in claim 5 wherein the hydraulic means includes radially reciprocal pistons for the fixed rotor and the hydraulically governing means for the second rotor includes radially reciprocal pistons for the rotor and a fixed housing surrounding the rotor.

JOHN W. HAMBLIN.